United States Patent
Tommesani

(10) Patent No.: US 10,858,204 B2
(45) Date of Patent: Dec. 8, 2020

(54) SLIDING LAYER GRIPPING DEVICE AND RELATIVE LAYER TRANSFER METHOD

(71) Applicant: OCME S.R.L., Parma (IT)

(72) Inventor: Marco Tommesani, Parma (IT)

(73) Assignee: Ocme S.r.l., Parma (IT)

(*) Notice: Subject to any disclaimer, the term of this patent is extended or adjusted under 35 U.S.C. 154(b) by 0 days.

(21) Appl. No.: 16/127,562

(22) Filed: Sep. 11, 2018

(65) Prior Publication Data

US 2019/0077614 A1    Mar. 14, 2019

(30) Foreign Application Priority Data

Sep. 11, 2017 (IT) .......................... 102017000101384

(51) Int. Cl.
*B65G 57/03* (2006.01)
*B65G 61/00* (2006.01)
*B65G 59/02* (2006.01)

(52) U.S. Cl.
CPC ............. *B65G 57/03* (2013.01); *B65G 59/02* (2013.01); *B65G 61/00* (2013.01);
(Continued)

(58) Field of Classification Search
CPC .. B65G 57/03; B65G 59/02; B65G 2814/031; B65G 2814/0305; B65G 2201/0267; B65G 2201/0235; B65G 61/00
See application file for complete search history.

(56) References Cited

U.S. PATENT DOCUMENTS 4,032,021 A * 6/1977 Mabey ................. B65G 59/005
414/796.8
4,493,599 A * 1/1985 Hartness .............. B65G 59/005
294/87.1
(Continued)

FOREIGN PATENT DOCUMENTS

DE    29907748 U1    8/2000
EP    1908709    *    4/2008    ............. B65G 57/24
(Continued)

OTHER PUBLICATIONS

Kaufman Depalletizing System—screenshots from YouTube video provided by Applicant; Sep. 15, 2014.*
(Continued)

*Primary Examiner* — Lynn E Schwenning
(74) *Attorney, Agent, or Firm* — Knobbe, Martens, Olson & Bear, LLP

(57) ABSTRACT

A sliding layer gripping device includes an anthropomorphic robot and a gripping head mounted on the robot for picking a first layer of products of a pallet. The gripping head includes a main frame, an upper compaction unit and an intermediate translation plane. The frame is connected to the intermediate translation plane and to the upper compaction unit with two pairs of linear translation guides arranged parallel to each other on the inner side of the sides of the main frame. A pair of belts moved by a brushless motor controlled by the robot is arranged between the main frame and the upper compaction unit for relative sliding of the main frame and the upper compaction unit with respect to the intermediate translation plane. The intermediate translation plane has a loading side of the layer opposite to an unloading side of the layer.

10 Claims, 9 Drawing Sheets

(52) U.S. Cl.
CPC ............... *B65G 2201/0235* (2013.01); *B65G 2201/0267* (2013.01); *B65G 2814/031* (2013.01); *B65G 2814/0305* (2013.01)

(56) References Cited

U.S. PATENT DOCUMENTS

| | | | | |
|---|---|---|---|---|
| 6,059,519 | A | 5/2000 | Dutto et al. | |
| 9,950,879 | B2* | 4/2018 | Toncelli | ............ B66C 17/06 |
| 2004/0240980 | A1* | 12/2004 | Nakazato | ............ B65G 65/00 |
| | | | | 414/788.7 |
| 2014/0126989 | A1* | 5/2014 | Silva | ............ B65G 59/023 |
| | | | | 414/796.2 |
| 2015/0307292 | A1* | 10/2015 | Ahlers | ............ B65G 57/14 |
| | | | | 414/793.5 |
| 2018/0229948 | A1* | 8/2018 | Kollmuss | ............ B65G 57/06 |

FOREIGN PATENT DOCUMENTS

| | | | |
|---|---|---|---|
| EP | 1908709 | A1 | 4/2008 |
| EP | 2923975 | * | 9/2015 ............ B65G 59/00 |
| EP | 2923975 | A1 | 9/2015 |
| KR | 101409616 | B1 | 6/2014 |
| WO | 2007/131668 | A1 | 11/2007 |
| WO | 2012/143898 | A1 | 10/2012 |

OTHER PUBLICATIONS https://www.youtube.com/watch?v=R1xpKyGGVw4#action=share; KPal K5—Full layer palletizer system designed for cases, bundles, and trays; Sep. 29, 2014; Kaufman Engineered Systems; Seconds 0:28-0:48.* https://www.youtube.com/watch?v=y9My-PO58NM#action=share; K5 Bulk Glass Palletizer System; Jun. 9, 2017; Kaufman Engineered Systems; Seconds 0:10-0:36, Seconds 2:00-2:34.*

Italian Search Report for Application No. IT 201700101384, dated May 18, 2018 in 2 pages.

Third Party Observation for Application No. EP18193343.3, dated Mar. 23, 2020 in 4 pages.

Third Party Observation for Application No. EP20180193343, dated Apr. 9, 2019 in 3 pages.

* cited by examiner

SLIDING LAYER GRIPPING DEVICE AND RELATIVE LAYER TRANSFER METHOD

CROSS-REFERENCE TO RELATED APPLICATION

This application claims priority to Italian Patent Application No. 102017000101384 filed on Sep. 11, 2017, the disclosure of which including the specification, the drawings, and the claims is hereby incorporated by reference in its entirety.

FIELD OF THE INVENTION

The present invention relates to a sliding layer gripping device and to a relative layer transfer method.

BACKGROUND OF THE INVENTION

In the palletizing field, the use of so-called layer depalletizers/palletizers operating according to different layer transfer principles is known.

A layer depalletizer is a machine capable of picking up a layer at a time from a pallet of products stacked in layers placed on top of a pallet, moving the picked layer on a storage transport means. Once the individual product units that make up the layer on said storage transport means have been deposited, such packages are separated by transport means and pushers according to the type of machine and product. A layer palletizer, on the other hand, allows picking a product layer from a pickup transport means and placing it on a pallet, stacking one layer onto the next one.

Fixed pallet sliding depalletizers usually have one or more lifting units which move two main groups along a predominantly vertical direction. The first group is called upper ring, which has the task of tightening the product to be picked up and dragging it over a plate-like element called intermediate plane. From this intermediate plane, the product is then dragged onto a storage transport means. The second group is called lower ring, which can integrate interlayer retaining grippers which serve to hold the insert sheet while dragging the product. The lower ring has the task of stabilizing the product above the pallet to prevent the product from breaking up and falling during the movement of the upper product layer. In faster machines, these units have independent lifting units, while in cheaper machines these two main groups are connected to the same lifting unit.

Anthropomorphic robots are advantageously used in palletizing and depalletizing for lifting the gripping members. This has some known advantages, such as reduced maintenance, the possibility of integrating more features into the gripping head, the possibility of working on multiple operating areas due to the large working area of the articulated arm. This advantageously allows, for example, picking the product from a plurality of pallets simultaneously and serving multiple production lines, or alternatively producing mixed product pallets by picking different products from different pallets layer by layer, in fact transforming the robot into a hybrid depalletizing and palletizing machine.

There are some gripping devices on the market which load the layer being picked on an intermediate plane, taking advantage of the coordinated movement with the gripping robot and using a ring that embraces the layer for loading. For example, document EP1724219A2 describes a gripper in which there is a centering unit integrally connected with the main frame of the gripper and provided with a roller blind capable of wrapping on one side, thus supporting the product. This solution is sub-optimal since the loading speed of the layer on the gripper is limited by the translation speed in linear motion in the horizontal direction of the robot. Moreover, the blind that wraps on one side often forces the gripper to rotate between picking and deposition, this movement can slow down the machine's rate. Third, a roller blind is not compatible with all products that can be palletized, in particular smaller products may have stability problems.

SUMMARY OF THE INVENTION

The object of the present invention is to provide a sliding layer gripping device and a relative layer transfer method with a high layer transfer speed.

Another object of the present invention is to provide a sliding layer gripping device and a relative layer transfer method which can be used both on pallets and on transport means and with a greater possible number of different products having different geometric shapes.

A further object of the present invention is to provide a layer gripping device wherein the loading side and the unloading side are on opposite sides of the gripper itself.

Another object of the present invention is to provide a sliding layer gripping device and a relative layer transfer method which are particularly simple and functional, with low costs.

These objects according to the present invention are achieved by providing a sliding layer gripping device and a relative layer transfer method as set forth in the independent claim.

Further characteristics are described in the dependent claims.

BRIEF DESCRIPTION OF THE DRAWINGS

The characteristics and the advantages of a sliding layer gripping device and a relative layer transfer method according to the present invention will become apparent from the following exemplary and non-limiting description, made with reference to the accompanying schematic drawings, in which.

DETAILED DESCRIPTION OF THE PREFERRED EMBODIMENTS

Figure 1:
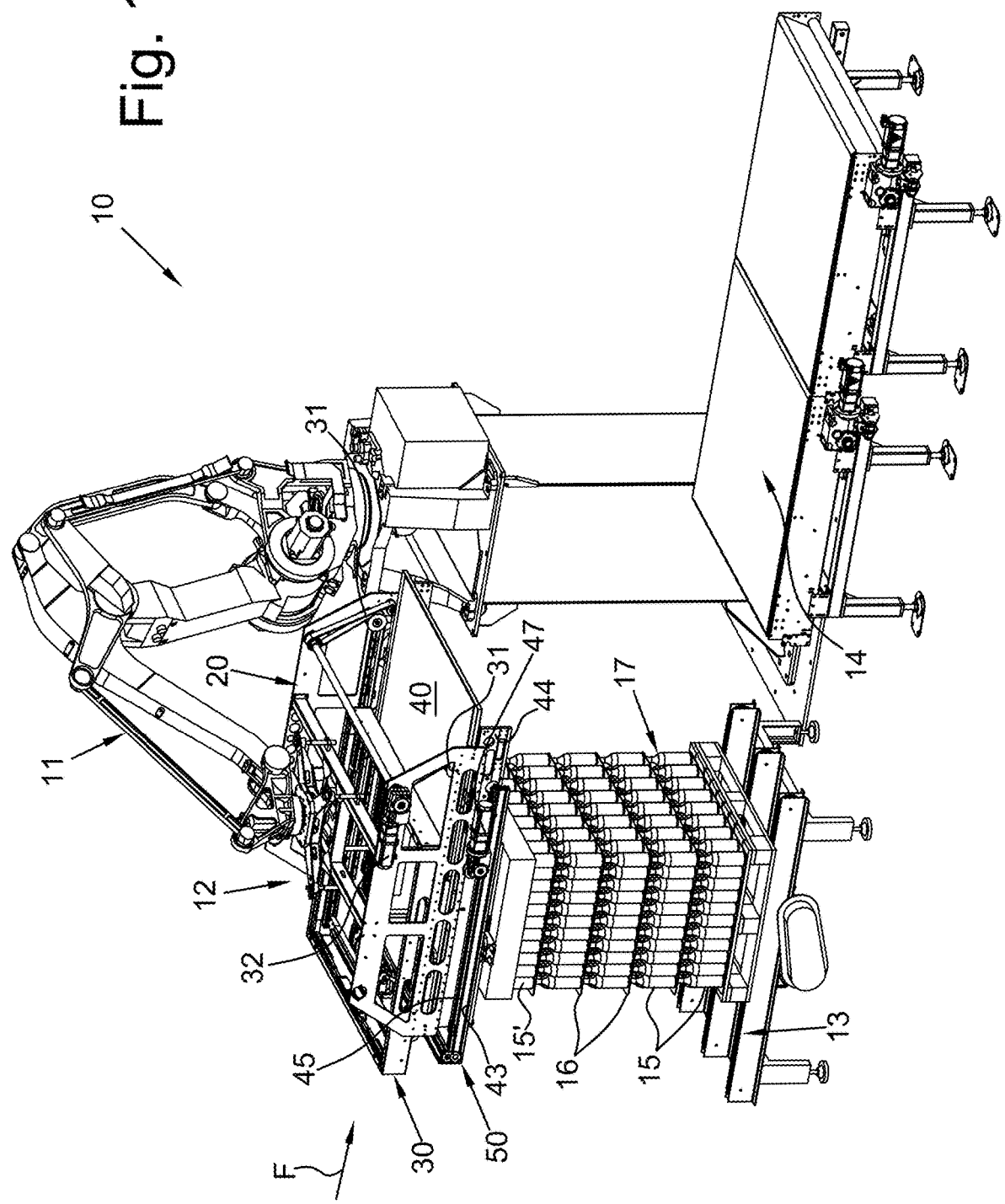
FIG. 1 is a perspective view of a sliding layer gripping device according to the invention placed in service between a stack of products forming a pallet and multiple side-by-side deposition belts.
Figure 2:
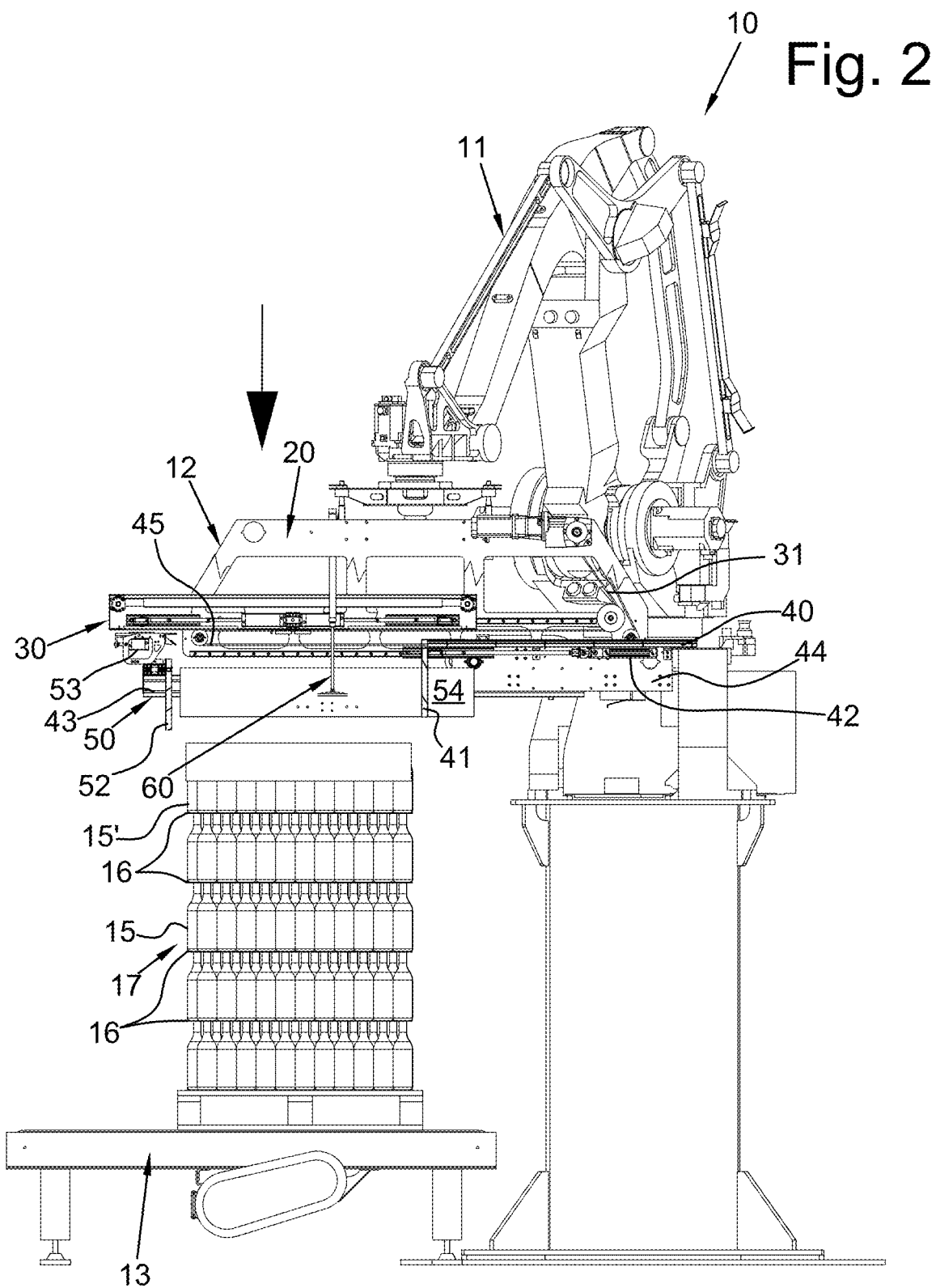
FIGS. 2 and 3 show an enlarged and partially cutaway side elevation view of the device of FIG. 1 in the loading operations respectively vertically approaching from above the product stack and resting on the upper side of the product stack.
Figure 3:
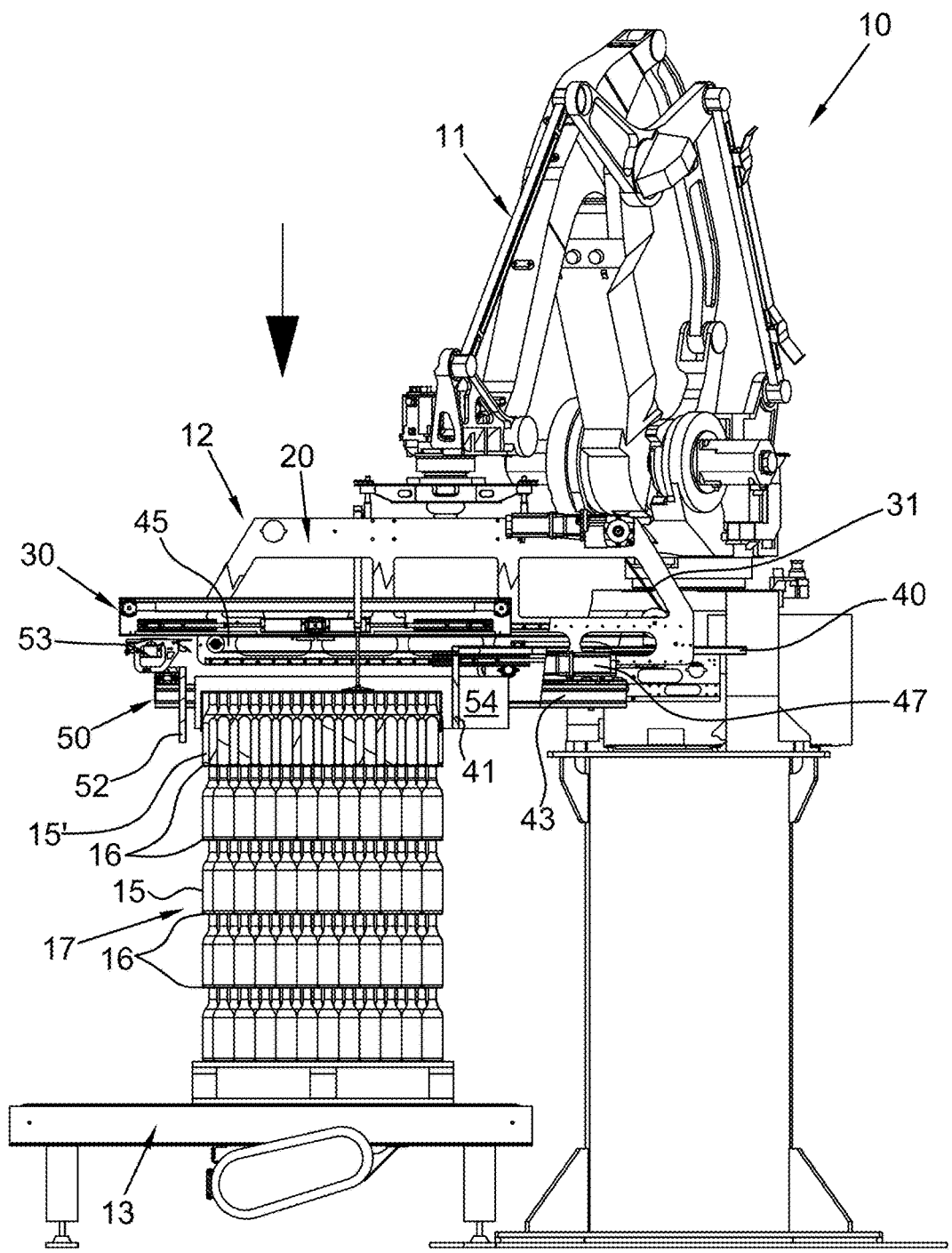
Figure 4:
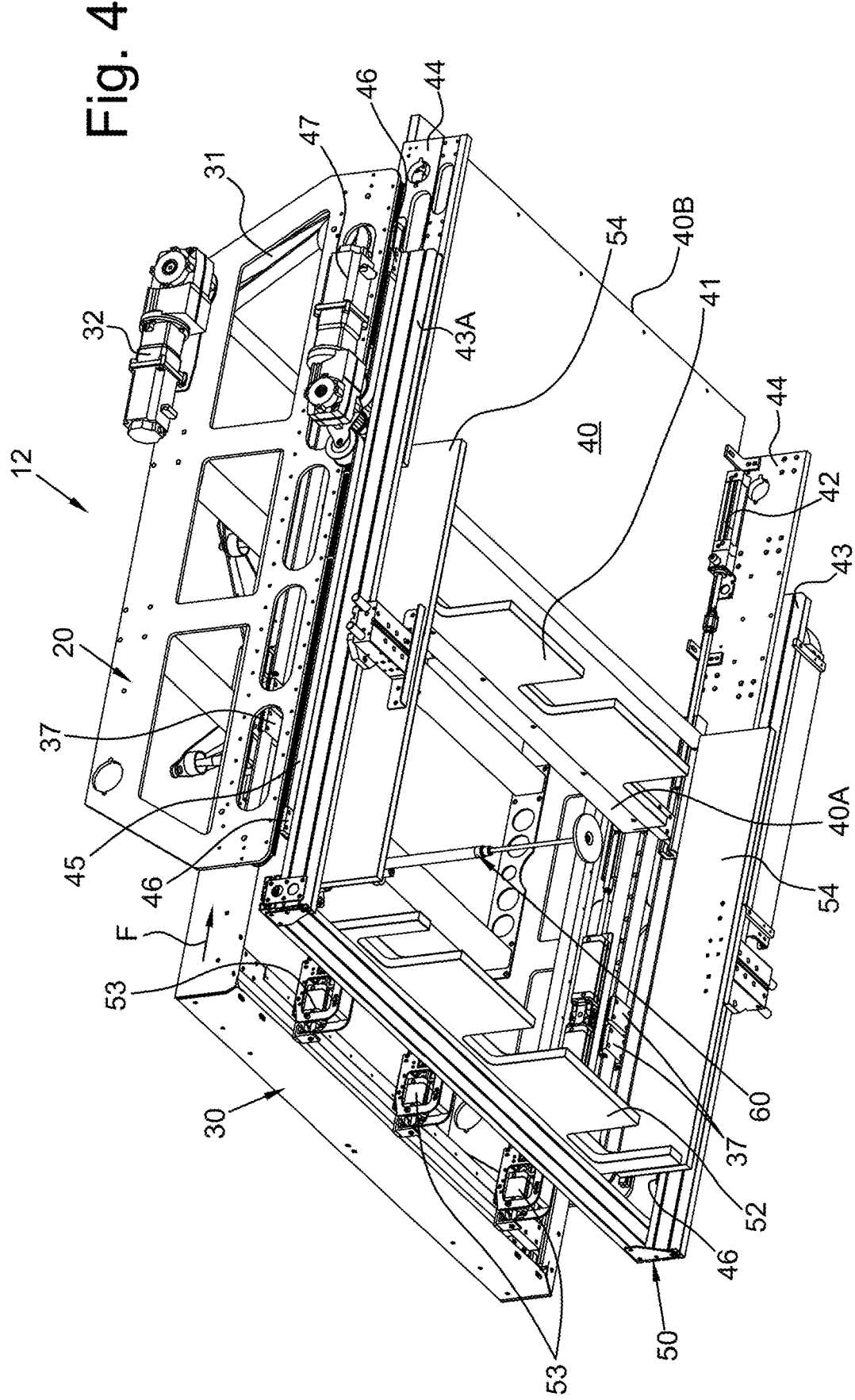
FIG. 4 shows the gripping head of the device of FIG. 1 enlarged and from the bottom.

With reference to the figures, a sliding layer gripping device indicated as a whole with reference numeral 10 is shown, comprising an anthropomorphic robot 11 and a gripping head 12 mounted on the robot 11 for picking up a first layer of products 15', for example from a pallet 17 consisting of layers of products 15 with interposed inserts 16.

Figure 9:
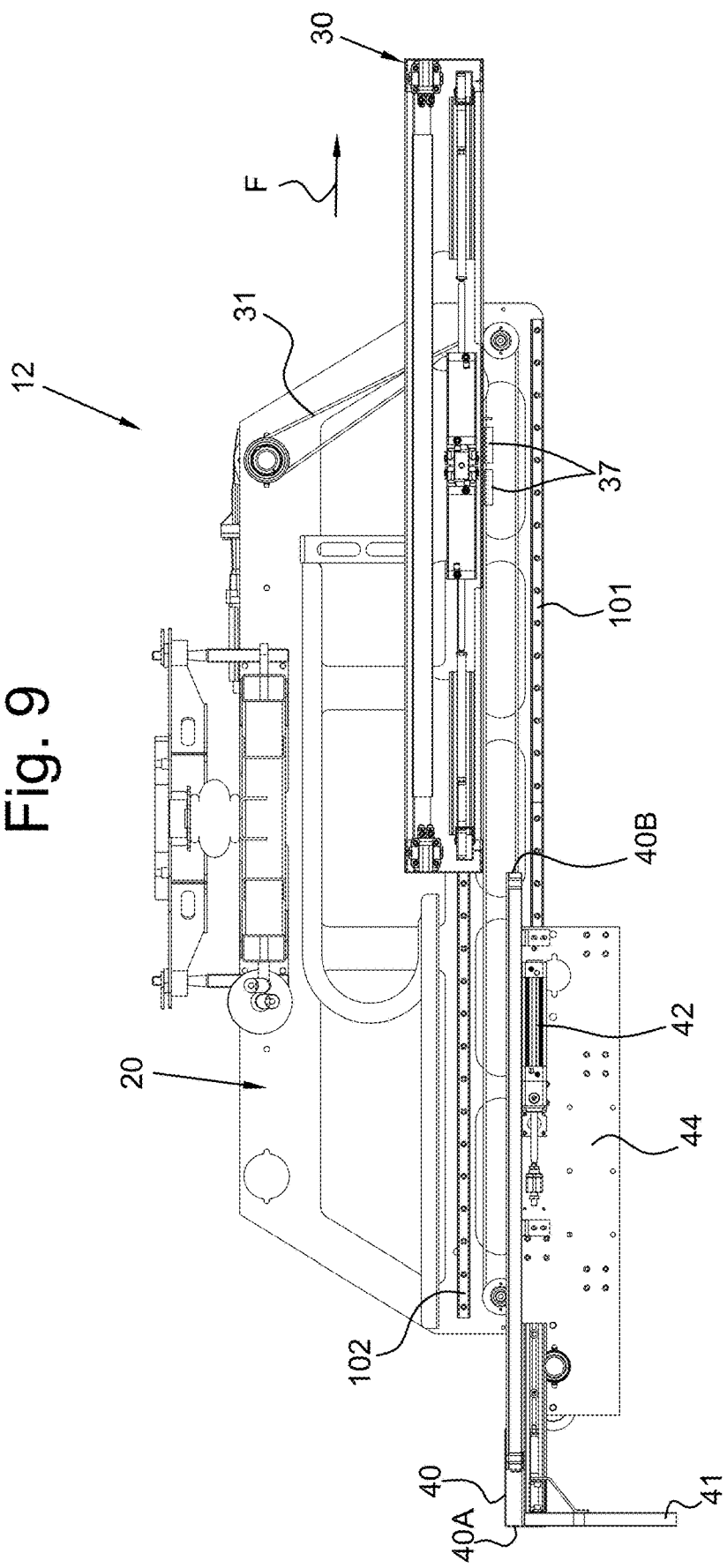
FIG. 9 is a view in the same section plane of FIG. 8 of a gripping head according to a minimum configuration of the invention.

The gripping head 12 comprises, according to a minimum configuration of the present invention in FIG. 9, a main frame 20 on which an upper compaction unit 30 and an intermediate transfer plane 40 are arranged, comprising a rigid flat surface supporting a product layer.

The main frame 20, which is connected to the robot 11, has two pairs of linear translation guides 101 and 102 arranged parallel to each other on the inner side of the sides thereof, respectively, for the relative sliding according to parallel and substantially horizontal planes operating between the intermediate translation plane 40 and the main frame 20, as well as between the same main frame 20 and the upper compaction unit 30.

The first pair of linear guides 101 is coupled with supporting boards 44 of the intermediate translation plane 40, which are fixedly connected thereto. The second pair of linear guides 102 is coupled to the outer sides of the upper compaction unit 30.

The strokes of the intermediate translation plane 40 and of the upper compaction unit 30 on the relative guides 101, 102 are beyond the overall dimensions of the main frame 20 itself, which brings the plane 40 and the unit 30 to a cantilevered arrangement on opposite sides of the main frame 20, thus creating a telescopic configuration of the elements.

During the loading operations of the layer 15' on the intermediate translation plane 40, the intermediate translation plane 40 remains stationary in space and the upper compaction unit 30 drags the layer 15' onto the same plane. The robot 11 moves in a horizontal direction at a certain speed $v_1$, the upper compaction unit 30 is connected to a motor synchronized with the robot 11 as well as the intermediate translation plane 40. The upper compaction unit 30 then moves in space in a horizontal direction at a speed $v_2=2*v_1$, while the intermediate translation plane 40 remains stationary in space.

The upper compaction unit 30 and the intermediate translation plane 40 are placed in relative translatory motion by means of a pair of belts 31, each of them arranged in a closed loop and connected via clamps 37 to opposite sides of the upper compaction unit 30. The pair of belts 31 is moved by a brushless motor 32, mounted on the main frame 20 and controlled by the robot 11.

In a coordinated manner with respect to the linear displacement of the robot from a picking position 13, for example on the pallet 17, to a depositing position 14, for example on a conveyor belt or on a pallet, the upper compaction unit 30 is thus moved towards the intermediate translation plane 40, with a loading movement of a product layer 15' on the translation plane, that is to say, with a movement in the loading direction marked by arrow F. The upper compaction unit 30 is subsequently moved beyond the intermediate translation plane 40 with an unloading movement of the product layer 15' from the translation plane, that is to say, with a movement in the same loading direction marked by arrow F. In fact, in the gripping head 12 according to the present invention, direction and loading and unloading directions coincide.

The intermediate translation plane 40 has a loading side 40A of the layer 15' opposite to an unloading side 40B of the layer 15'.

Figure 5:
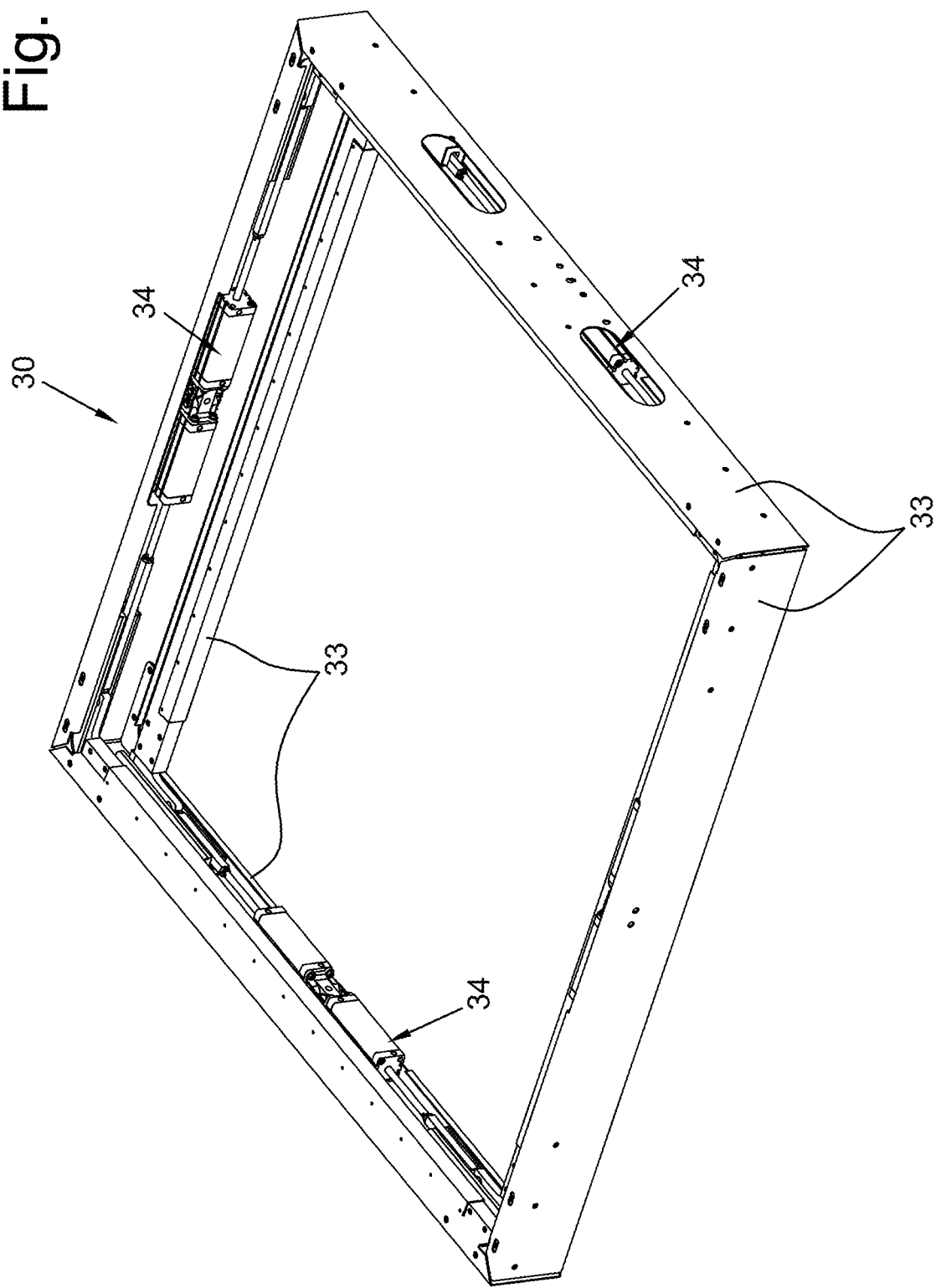
FIGS. 5 and 6 show a first and a second embodiment, respectively, of an upper ring of the gripping head according to the invention.

The upper compaction unit 30, shown in FIG. 5 according to a first embodiment, has four gripping boards 33 movable inwards, i.e. towards the axis of the gripping head 12 which close the layer 15' on the four sides, each one controlled by one or more pneumatic or motorized actuators 34, in the example shown by two actuators 34.

Figure 6:
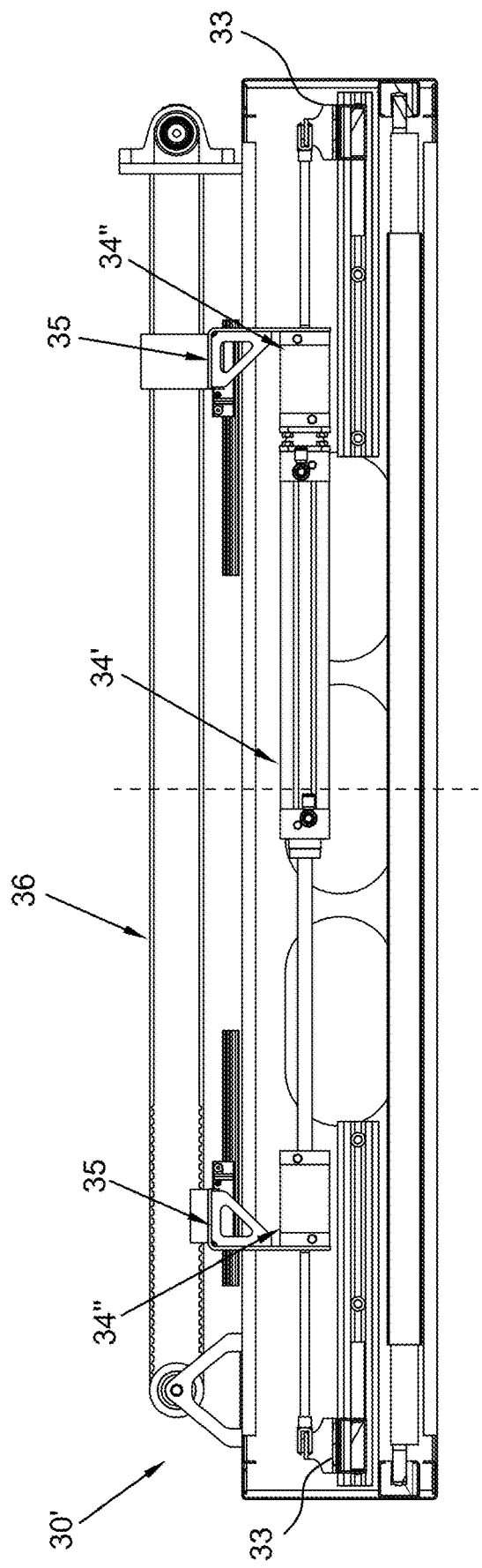
Figure 7:
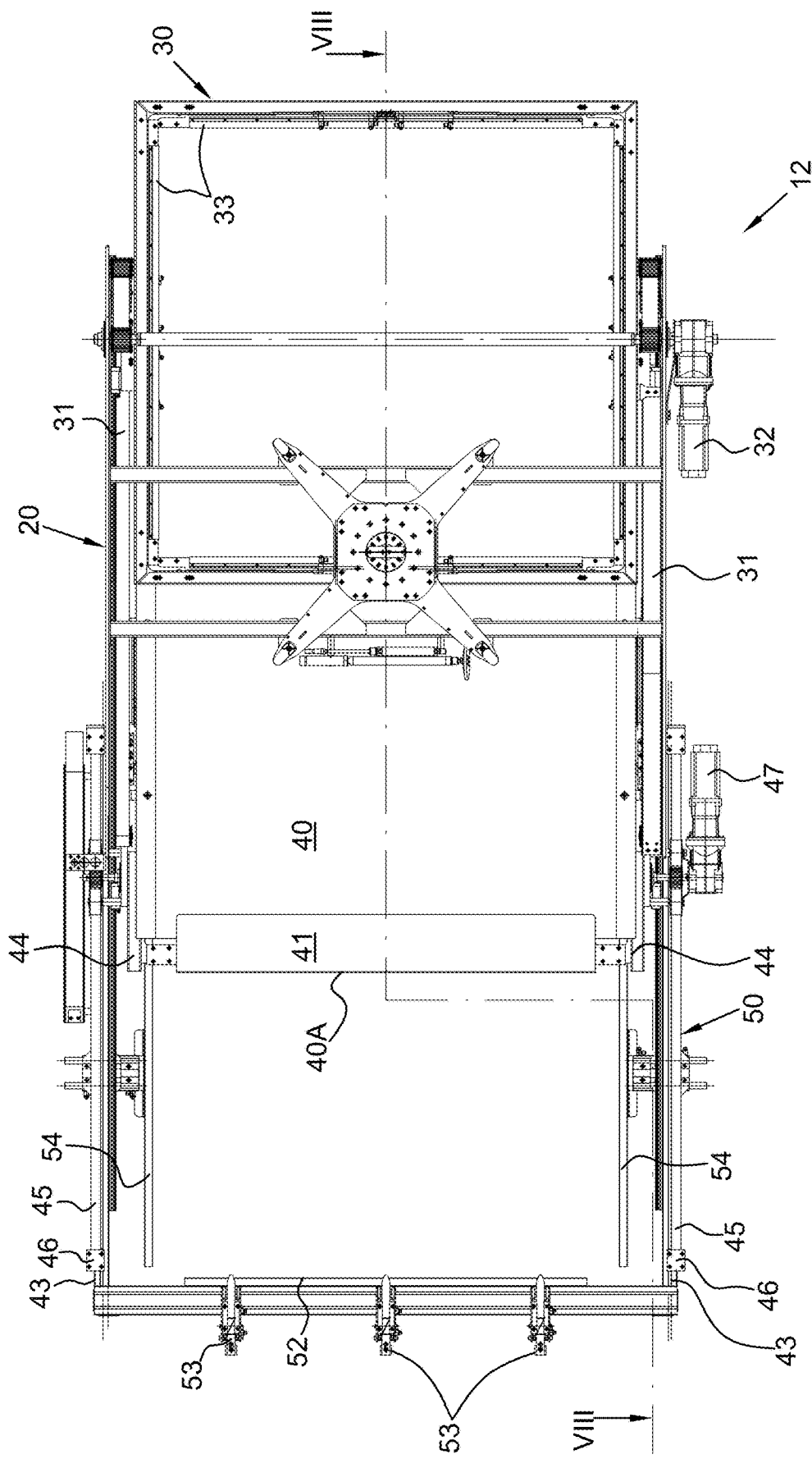
FIG. 7 is a plan view of the gripping head of the device of FIG. 1 in the unloading operations in the maximum stroke of the telescopic guides.
Figure 8:
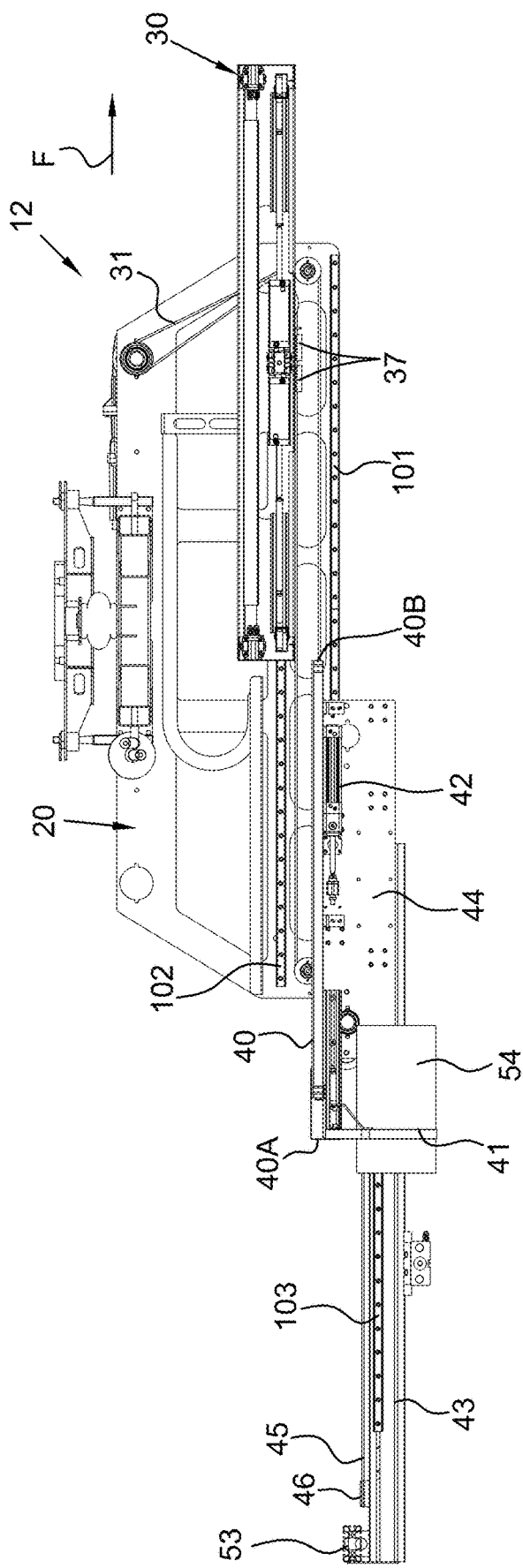
FIG. 8 is a section of the gripping head of FIG. 7 formed in the trace plane VIII-VIII.

According to a further embodiment of FIG. 6 of the upper compaction unit 30', the boards 33 can be controlled in self-centring mode, which can be deactivated by pneumatic control. In the upper compaction unit 30', first actuators 34' are connected to centring elements 35, kinematically connected to each other by a belt 36, or equivalently linkage, so that they move in a mirror-like manner with respect to the axis of the gripping head 12. On these centring elements 35, further pneumatic actuators 34" are positioned, which connect the centring elements 35 to the gripping boards 33. By adjusting the position and the working pressure of such pneumatic actuators 34" it is possible to make the relative position between the centring elements 35 and the boards 33 rigid and integral or released.

In a first case in which the gripping head 12 picks up a layer of product 15' to stack it on a pallet, it is advantageous that the boards 33 of the upper compaction unit 30' centre the layer 15' in the middle of the ring consisting of the upper compaction unit 30' itself so that the position of such a product layer 15' is known and precise in order to correctly stack the product layers onto the pallet. To do this, the boards 33 are connected to move in a mirror-like manner with respect to the centre line axes of the ring. In this case, the cylinders 34" remain open in abutment, so that the boards 33 move in a self-centring manner following the motion of the centring elements 35.

On the contrary, in a second case in which the product layer 15' is picked from a pallet, it is preferable to use the upper compaction unit 30' provided with self-centring and releasable boards 33, so that the ring consisting of the upper compaction unit 30' is adapted to the actual position of the product layer 15' to be picked to avoid breaking up the product itself and causing it to fall. To do this, the elements 34" are closed with a minimal pressure, so as to open as soon as the board 33 encounters the obstacle presented by the layer 15' without breaking it up. To then deposit the product layer 15' on another pallet, it is preferable to bring it on the intermediate translation plane 40, reshape it with the boards 33 in self-centring mode and deposit it on the pallet, maintaining control of the boards 33 in self-centring mode.

The gripping head 12 further comprises a lower compaction unit 50 for stabilizing the product pallet 17 by tightening the layer 15 underlying the layer 15' being picked up, which according to a preferred embodiment of the invention is integrated into the gripping head 12.

Otherwise, the lower compaction unit, according to an embodiment not shown, may be independent of the robot and of the gripping head and made according to known methods.

The lower compaction unit 50 integrated into the gripping head 12 is connected to the intermediate translation plane 40 and is therefore moved in height with respect to the product pallet integrally with the robot 11 and the gripping head 12.

The lower compaction unit 50 comprises two parallel sides 43 provided on the opposite inner sides with a pair of linear translation guides 103 coupled to the support sides 44 of the intermediate translation plane 40. A rear abutment board 52 is placed between the sides 43 on the opposite side with respect to the intermediate translation plane 40. The rear abutment board 52 is provided with holding grippers 53 of the inserts 16.

A pair of lateral boards 54, placed within the sides 43, are transversely movable for compaction and holding in a direction orthogonal to the loading/unloading direction by sliding of the layer 15, underneath the layer 15' being picked.

The lower compaction unit 50 is provided with a horizontal approaching and/or distancing movement with respect to the intermediate translation plane 40 which closes around the product layer underneath the layer 15' being picked. A pair of belts 45, fixed by clamps 46 to the sides 43, is moved by a brushless motor 47 which is fixed on one of the sides 44 of the translation plane 40.

The motor 47 alternately allows approaching the rear board 52 and the holding grippers 53, releasing the grip on the lower layer 15 and bringing the lower compaction unit 50 to a rest position, that is to say, open with respect to the product layer 15.

The intermediate translation plane 40 has a reference board 41 controlled by a pneumatic actuator 42 which rests on the side of the layer 15 underneath the layer 15' being picked to ensure a continuous sliding plane. Holding grippers for the inserts 16 may be adapted to the housing within the reference board 41.

The gripping head 12 may also have a scanning unit 60 capable of controlling the actual height of the pallet 17 being processed and ensuring an always precise level of translation.

The telescopic guide system integrated in the main frame 20, in the upper compaction unit 30 and in the intermediate translation plane 40, enables the loading and unloading of the product layer 15' in the same direction of movement according to arrow F with a stroke of each element slightly greater than the dimensions of the pallet 17.

For example, for a pallet 17 having a length of 800 mm in the loading/unloading direction of the layer, the stroke of the elements consists of about 1000 mm.

In the layer gripping device 10 according to the invention, starting from the configuration in which the main frame 20, the upper compaction unit 30 and the lower compaction unit 50 are centred, for example on a pallet 17, for the loading of a product layer on the gripping head 12, the main frame 20, carrying the upper compaction unit 30, slides in translation on the pair of main guides 101 according to a first stroke, while the robot 11 translates in the same direction by a stroke equal to half the stroke of the upper compaction unit 30. For the subsequent unloading of the layer 15' from the intermediate translation plane 40 to a storage station 14, always performing a movement combined with the robot 11, then the upper compaction unit 30 translates with respect to the main frame 20 by a second stroke, reaching a cantilevered configuration in a direction opposite the intermediate translation plane 40.

The working cycle of the sliding layer gripping device 10 according to the invention provides that the robot 11 approaches, with a predominantly vertical movement, the product pallet 17 being processed. If the product pallet 17 has just been loaded, the robot 11 checks the height thereof with scanning unit 60, if present.

Once the picking level has been reached, with a coordinated movement of the robots 11 and motors 32 and 47, the rear board 52 approaches the lower product layer 15 with respect to the layer 15' to be transferred and the reference board 41 disengages the opening end of stroke.

The lateral boards 54 of the lower compaction unit 50 and the four lateral gripping boards 33 of the upper compaction unit 30 are closed.

The robot 11 and the motor 32 move in a coordinated movement to transfer the layer 15' above the intermediate translation plane 40. The motor 47 remains stationary to hold the lower compaction unit 50 in position above the pickup pallet 17.

The layer 15' present on the intermediate translation plane 40 can be unloaded onto a belt or onto another product pallet according to the robot's mission.

In the first case of unloading of the layer 15' on a belt, the robot 11 brings the level of the intermediate transfer plane 40 to a height close to the height of the deposition conveyor belt approached in a horizontal direction, that is to say, at a distance in the horizontal direction as small as possible. The robot 11 and the motor 32 move the intermediate translation plane 40 and the upper compaction unit 30 so that the plane remains stationary in space while the upper compaction unit 30 moves in a predominantly horizontal direction until all the layer 15' being picked is moved above the belt. The belt may be stationary or advantageously move in the same direction as the drag and at the same speed. Depending on the layout of the island, the lower compaction unit 50 may be in the maximum opening position, so as not to hit the pallet to be palletized, in order to avoid the cycle of extraction and closure necessary to remove the encumbrance of the lower compaction unit 50. If it is not possible due to the configuration of the island, after the transfer of the layer 15' on the intermediate translation plane 40, the robot 11 carries out an approximately vertical upward movement, thus allowing closing of the lower compaction unit 50 in rest position, completely transferred underneath the intermediate translation plane 40.

In the second case of unloading of the layer 15' on a pallet 17, the robot 11 places the gripping head 12 above the product pallet 17, so that the upper compaction unit 30 and the layer 15' contained therein are centred vertically with the product on the pallet 17. The motor 32 and the robot 11 move in coordinated motion in such a way that in this case, the upper compaction unit 30 remains stationary in space while the intermediate translation plane 40 moves away on one side. The lower compaction unit 50 is not used in this case and is in the closed position.

In addition, there is also another possibility, that is, picking the layer 15' from a transport means with the upper compaction unit 30 and dragging it onto the intermediate translation plane 40, performing this horizontal translation movement, approaching the intermediate translation plane 40 to the unloading side of the belt, and then carrying out the mission of deposition on the pallet as in the previous point.

The layer transfer method implemented with the sliding layer gripping device 10 according to the invention provides different compositions of the working cycle according to whether the picking and/or the deposition take place on a pallet or on a transport means through the following combinable missions:

a. pickup on pallet: checking the level of product layer 15' to be picked, tightening the lower compaction unit 50 using the coordinated motion of robot 11 and motors 32 and 47 and lateral boards 54, adaptive tightening of the boards 33 of the upper compaction unit 30' and transfer onto the intermediate translation plane 40 by using the coordinated motion of the robot 11 and of the motor 32, releasing the lower layer to the layer 15' by opening the boards 54 and 52 and optionally opening the grippers 53, vertically rising the robot 11 out of the footprint of the lower compaction unit 50 and closing the same with motor 47;
b. storage on transport means: descent to the unloading level, coordinated motion of the robot 11 and upper compaction unit 30, 30', opening of the boards 33, movement of the robot 11 in the vertical upward direction;
c. pick-up on the transport means: descent to the loading level with vertical movement, closing of the upper compaction unit 30, 30' symmetrically with respect to the ring centre line, dragging on the intermediate translation plane 40 with coordinated movement of robot 11 and motor 32;
d. deposition on pallet: descent to the deposition level with centre of the upper compaction unit 30' aligned with the centre of the pallet 17 and closed in self-centring mode, extraction of the intermediate translation plane 40 using coordinated motion of robot 11 and motor 32, release of the pressure of boards 33 and vertical upward movement of the robot 11;
e. fast cycle for fast pick-up from pallet and deposition on near transport means. As for point a, except that after opening the boards 54 and 52, the robot 11 moves vertically directly to the deposition level by performing mission b, leaving the pallet 17 inside the lower compaction unit 50.

The sliding layer gripper and the relative layer transfer method according to the present invention have the advantage of obtaining a translation speed of the layer on the plane not limited by the linear speed of the robot, as the speed of the layer is twice the linear speed of the robot gripping head.

Another advantage consists in the telescopic movement of the guides, which allows depositing the layer on the opposite side with respect to the loading side, allowing the layer to be deposited without rotating the gripping head.

Advantageously, moreover, the fact of having a loading direction on the intermediate plane and an unloading direction allows optimizing the geometry of the intermediate plane to improve the two operations. Typically, the loading side has a coupling sheet which allows the product to flow correctly over a continuous surface without spaces. The unloading side, instead, in palletizing applications, should have a tip capable of reducing the dropping space of the product from the plane to the deposition level, so as not to break down the packages that make up the layer.

Advantageously, the sliding layer gripping device according to the invention can have a compacting unit of the lower layer connected to the transfer plane unit. Integrating this transfer plane unit directly into the gripper prevents the construction of many independent units, typically for applications where the robot works on two or more product picking bays.

Furthermore, an operating cycle is described such that the presence of this unit marginally slows down the robot cycle.

The sliding layer gripping device and a relative layer transfer method thus conceived may be subjected to several modifications and variants, all falling within the invention; moreover, all details may be replaced with technically equivalent elements. In practice, the materials used, as well as their dimensions, may be any according to the technical requirements.

What is claimed is:

1. A sliding layer gripping device, comprising an anthropomorphic robot and a gripping head mounted on the robot for picking a first layer of products of a pallet,
wherein the gripping head comprises a main frame and also an upper compaction unit and an intermediate translation plane arranged on the main frame,
wherein said main frame is connected to the intermediate translation plane and to the upper compaction unit with a first pair of linear translation guides and a second pair of linear translation guides, respectively, arranged parallel to each other on the inner side of the sides of the main frame,
wherein a pair of belts moved by a brushless motor controlled by the robot is arranged between the main frame and the upper compaction unit for the relative sliding of the main frame and of the upper compaction unit with respect to the intermediate translation plane according to parallel planes, and substantially horizontal in operation, and
wherein the intermediate translation plane has a loading side of the layer opposite to an unloading side of the layer,
wherein the gripping head comprises a lower compaction unit connected to the intermediate translation plane with a pair of linear translation guides, and
wherein the lower compaction unit comprises two parallel sides provided, on opposite inner sides, with the pair of linear translation guides coupled with the intermediate translation plane, a rear abutment board placed between the sides on the opposite side with respect to the intermediate translation plane, and also a pair of transversely movable lateral boards placed within the sides.

2. The device according to claim 1, wherein said lower compaction unit comprises a pair of belts fixed to the sides and moved by a brushless motor placed on board the translation plane.

3. The device according to claim 1, wherein the rear abutment board is provided with holding grippers of inserts.

4. The device according to claim 1, wherein the upper compaction unit has four movable gripping boards which close the layer on the four sides.

5. The device according to claim 4, wherein each of the movable gripping boards is controlled by at least one pneumatic or motorized actuator.

6. The device according to claim 4, wherein first actuators are connected to centring elements which are movable symmetrically with respect to a center axis of the upper compaction unit and carry other pneumatic actuators which connect the centring elements to the movable gripping boards for a movement thereof symmetrically with respect to the axis, or adapting themselves by resting on the product of the layer to be picked with independent movements.

7. A method for transferring layers with a sliding layer gripping device comprising an anthropomorphic robot and a gripping head mounted on the robot for picking a first layer of products of a pallet,
wherein the gripping head comprises a main frame and also an upper compaction unit and an intermediate translation plane arranged on the main frame,
wherein said main frame is connected to the intermediate translation plane and to the upper compaction unit with a first pair of linear translation guides and a second pair of linear translation guides, respectively, arranged parallel to each other on the inner side of the sides of the main frame,
wherein a pair of belts moved by a brushless motor controlled by the robot is arranged between the main frame and the upper compaction unit for the relative sliding of the main frame and of the upper compaction unit with respect to the intermediate translation plane according to parallel planes, and substantially horizontal in operation, wherein the intermediate translation plane has a loading side of the layer opposite to an unloading side of the layer, and wherein the gripping head comprises a lower compaction unit connected to the intermediate translation plane with a pair of linear translation guides, and wherein the lower compaction unit comprises two parallel sides provided, on opposite inner sides, with the pair of linear translation guides coupled with the intermediate translation plane, a rear abutment board placed between the sides on the opposite side with respect to the intermediate translation plane, and also a pair of transversely movable lateral boards placed within the sides, the method comprising:

picking a layer from a pallet or from a transport means; and depositing onto the same or different pallet or transport means, wherein picking the layer comprises:
positioning the gripping head at the picking level;
tightening the boards of the upper compaction unit about the layer; and
dragging the layer on the intermediate translation plane with coordinated movement of robot and brushless motor; and wherein depositing the layer comprises:
positioning the gripping head at the unloading level;
dragging the layer from the intermediate translation plane to the unloading position with coordinated movement of robot and upper compaction unit;
opening the boards and releasing the layer; and
raising the gripping head upwards again by means of the robot.

8. The method according to claim 7, wherein the picking on the pallet comprises at least one step selected from the group consisting of:
checking the level of the layer of product to grip;
tightening the boards of the lower compaction unit by taking advantage of the coordinated motion of robot and brushless motors controlled by the robot, and of lateral boards;
adapting the position of the boards of the upper compaction unit to the position of the layer;
releasing the boards of the lower compaction unit; and
ascending vertically again with the gripping head up to a position outside the volume of the lower compaction unit and closing the same.

9. The method according to claim 7, wherein the depositing onto a pallet further comprises:
aligning, in the descent, the upper compaction unit with the center of the pallet and closing it in a self-centring manner.

10. The method according to claim 7, wherein the method comprises a quick picking cycle of a layer from the pallet and depositing onto the adjacent transport means, said quick picking cycle consisting of:
checking the level of the product layer to grip;
tightening the boards of the lower compaction unit by taking advantage of the coordinated motion of robot and brushless motors controlled by the robot, and of lateral boards;
tightening the boards of the upper compaction unit about the layer by adapting the position of the boards of the upper compaction unit to the position of the layer;
dragging the layer on the intermediate translation plane with coordinated movement of robot and brushless motor;
opening the boards and releasing the layer;
positioning the gripping head vertically by means of robot directly at the deposit level by performing the step of depositing on the transport means, leaving the pallet inside the lower compaction unit.

* * * * *